United States Patent Office 3,433,844
Patented Mar. 18, 1969

3,433,844
VINYLADAMANTANE PREPARATION
Eugene C. Capaldi, Broomall, and Leonard N. Leum, Media, Pa., assignors to Atlantic Richfield Company, Philadelphia, Pa., a corporation of Pennsylvania
No Drawing. Filed Nov. 30, 1967, Ser. No. 686,843
U.S. Cl. 260—666 13 Claims
Int. Cl. C07c 1/24

---

ABSTRACT OF THE DISCLOSURE

Novel compositions of matter comprising vinyladamantanes useful as intermediates in the preparation of epoxyethyladamantanes.

---

A process for the preparation of vinyladamantanes comprising subjecting an alpha - methyl - 1 - adamantanemethanol to dehydration.

BACKGROUND OF INVENTION

This invention relates to novel compositions of matter characterized by the formula

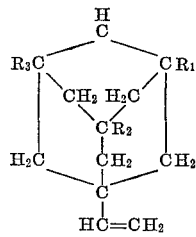

hereinafter referred to as

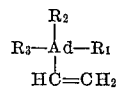

wherein Ad represents the adamantane nucleus, $R_1$ attached to a bridgehead carbon atom is an alkyl group having from 2 to 10 carbon atoms and $R_2$ and $R_3$ attached to bridgehead carbon atoms are individually selected from the group consisting of hydrogen and alkyl groups having from 1 to 10 carbon atoms with the proviso that the total number of carbon atoms in said alkyl groups is not more than 20.

This invention also relates to the method of preparation of 1-vinyladamantanes having from none to 3 alkyl substituents in addition to the vinyl substituent.

The carbon nucleus of adamantane contains ten carbon atoms arranged in a completely symmetrical, strainless manner such that there are three condensed 6-member rings and four bridgehead carbon atoms. The structure of adamantane ($C_{10}H_{16}$) is commonly depicted as follows:

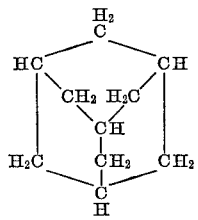

hereinafter referred to as

wherein Ad represents the adamantane nucleus.

The molecule contains four tertiary hydrogen atoms attached respectively at the bridgehead carbon atoms. All four bridgehead carbons are equivalent to each other and likewise, all rings are equivalent.

SUMMARY OF INVENTION

According to our invention we have now discovered a method for the preparation of 1-vinyladamantanes having from none to 3 alkyl substituents in addition to the vinyl substituent. We have discovered that the compounds produced in accordance with our invention can be obtained from alpha-methyl - 1 - adamantanemethanol. More specifically, from alpha-methyl-1-adamantanemethanol having from none to 3 alkyl substituents. In accordance with our invention, the 1-hydroxyethyl group is subjected to dehydration and is converted to a vinyl group. A 1-vinyl derivative having the same carbon skeletal arrangement as the starting hydrocarbon is thus produced. The 1-vinyl derivative can thereafter be separated from the reaction mixture in a conventional manner.

Representative vinyl compounds that can be prepared in accordance with our invention are as follows:

1-vinyladamantane
1-vinyl-3-methyladamantane
1-vinyl-3,5-dimethyladamantane
1-vinyl-3,5,7-trimethyladamantane
1-vinyl-3-ethyladamantane
1-vinyl-3-methyl-5-ethyladamantane
1-vinyl-3,5-dimethyl-7-ethyladamantane
1-vinyl-3-propyladamantane
1-vinyl-3-amyladamantane
1-vinyl-3-heptyladamantane
1-vinyl-3-decyladamantane
1-vinyl-3,5-didecyladamantane
1-vinyl-3,5,7-tripropyladamantane
1-vinyl-3-butyl-5-ethyl-7-propyladamantane Each of the above named compounds is formed by dehydration of the corresponding 1-hydroxyethyl substituted compound.

The compounds produced in accordance with our invention are useful in the preparation of epoxyethyladamantanes, said epoxyethyladamantanes being useful in the preparation of polymers. The polymers are useful in making wax additives, gaskets and rubber like compositions.

It is therefore an object of our invention to provide novel compositions of matter.

It is another object of our invention to provide a novel method for the preparation of vinyl adamantanes.

Other objects, advantages and features of our invention will be apparent to those skilled in the art without departing from the spirit and scope of our invention, and it should be understood that the latter is not necessarily limited to the accompanying discussion.

In one aspect our invention relates to novel compositions of matter wherein said compositions are characterized by the formula

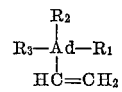

wherein Ad represents the adamantane nucleus, $R_1$ is an alkyl group having from 2 to 10 carbon atoms and $R_2$ and $R_3$ are individually selected from the group consisting of hydrogen and alkyl groups having from 1 to 10 carbon atoms with the proviso that the total number of carbon atoms in said alkyl groups does not exceed 20.

In another aspect our invention relates to a process for the preparation of vinyladamantanes comprising contacting a material characterized by the formula

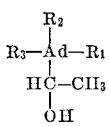

wherein Ad represents the adamantane nucleus, and $R_1$, $R_2$ and $R_3$ are selected from the group consisting of hydrogen and alkyl groups having from 1 to 10 carbon atoms with the proviso that the total number of carbon atoms in said alkyl groups does not exceed 20, with a dehydration agent selected from the group consisting of boric acid, acetic acid, and aluminum oxide.

In yet another aspect our invention relates to a method for preparing vinyladamantanes comprising contacting a material characterized by the formula

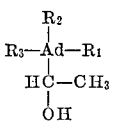

wherein $R_1$, $R_2$ and $R_3$ are the substituents as previously defined, with a base and carbon disulfide thereby forming a xanthate salt, contacting said xanthate salt with methyl iodide, thereby forming a xanthate ester and subjecting said ester to pyrolysis thereby forming said vinyladamantane.

PREFERRED EMBODIMENT

In accordance with our invention, an alpha-methyl-1-adamantanemethanol is subjected to dehydration in order to produce the corresponding vinyladamantane. The method of preparation of the alpha-methyl-1-adamantanemethanol is known to those skilled in the art. The alpha-methyl-1-adamantanemethanol can be most conveniently prepared by converting an adamantane carboxylic acid to a methyl adamantyl ketone, and thereafter, converting the ketone to the alpha-methyl-1-adamantanemethanol. The adamantane carboxylic acid can be prepared in the manner as set forth in Lamola, A. A., 3,250,805 (1966) by heating a mixture of adamantane with at least 3 parts by weight of at least 90 percent sulfuric acid at about 25° C. to about 175° C. in the presence of carbon monoxide at a pressure of at least 3 atmospheres and pouring the resulting mixture into water to produce a solid crystalline mixture of adamantane carboxylic acids.

The method for preparing the alpha-methyl-1-adamantanemethanol is also suitable for the preparation of alpha-methyl-1-adamantanemethanol having from 1 to 3 alkyl substituents. For example, starting with an alkyladamantane there would first be obtained an alkyladamantane carboxylic acid which can then be converted to the alkyl alpha-methyl-1-adamantanemethanol. In addition, alkyl substituents can be added to the bridgehead carbon atoms of the adamantane nucleus of alpha-methyl-1-adamantanemethanol in the manner as described in the copending application of Capaldi, E. C., entitled Alkyl Adamantane Ser. No. 686,838 filed concurrently herewith, and incorporated herein by reference.

According to one embodiment of our invention, alpha-methyl-1-adamantanemethanol is subjected to dehydration in the presence of a dehydration agent selected from the group consisting of boric acid and acetic acid. A mixture of alpha-methyl-1-adamantanemethanol and boric acid or acetic acid is slowly heated to first temperature within the range of from about 100° C. to about 160° C. and held at said first temperature for a time sufficient to convert the alcohol to an adamantyl ester. The temperature is then increased to a second temperature in the range of from about 220° C. to about 400° C. and held at said second temperature for a time sufficient to pyrolyze the ester, thereby forming the vinyladamantane. The vinyladamantane can thereafter be removed from the reaction media by conventional methods, for example by distillation.

The reaction of the alpha-methyl-1-adamantanemethanol with the boric acid or acetic acid can be carried out in either a batch or a continuous type operation. In a batch type operation, the desired proportion of alpha-methyl-1-adamantanemethanol and boric acid or acetic acid are introduced into a suitable reactor. The resulting comingled materials are contacted until a substantial proportion of the reactants are converted to the desired vinyladamantane.

The dehydration is preferably carried out in the liquid phase, for example, in a distillation type assembly wherein alpha-methyl-1-adamantanemethanol and the acid, either the boric acid or acetic acid, can be contacted and treated together in a distillation pot, at a temperature and pressure sufficient to maintain refluxing conditions. It will be appreciated and understood by those skilled in the art that the specific reaction temperature will depend upon the specific compound being dehydrated. The pressure need only be sufficient to keep the reactants substantially in the liquid phase.

In accordance with another embodiment of our invention, the alpha-methyl-1-adamentanemethanol can be dehydrated with aluminum oxide ($Al_2O_3$). In this particular embodiment, the alpha-methyl-1-adamantanemethanol is passed in the vapor phase through a reaction zone containing a bed of aluminum oxide. The temperature is maintained in the range of from about 300° C. to about 420° C., preferably, in the range of from about 350° C. to about 400° C., the pressure merely being sufficient to permit passage of the alpha-methyl-1-adamantanemethanol through the bed of aluminum oxide. The liquid hourly space velocity is maintained in the range of from about 0.5 to about 5.0, preferably in the range of from about 0.5 to 3.0. The vinyladamantane which is produced is condensed and purified in a conventional manner, for example, by means of distillation. Although applicants do not wish to be bound by any particular theory, it is believed that the alpha-methyl-1-adamantanemethanol when contacted with the aluminum oxide is converted to an intermediate ester which is pyrolyzed at the temperatures employd.

In yet another embodiment of our invention, alpha-methyl-1-adamantanemethanol is converted to vinyladamantane through means of the intermediate formation of a xanthate ester. The method of dehydration according to this embodiment is represented by the following equation wherein Ad repersents the adamantane nucleus:

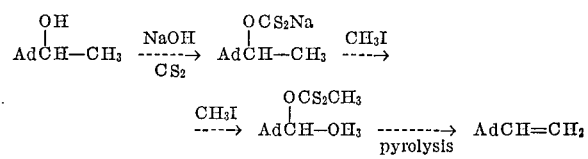

The alpha-methyl-1-adamantanemethanol is first contacted with carbon disulfide and a base, such as, for example, sodium hydroxide or potassium hydroxide in the presence of a solvent such as for example, ether, dioxane, tetrahydrofuran in order to form the xanthate salt. If desired, carbon tetrachloride can be added to the solvent. The xanthate salt is then contacted with methyl iodide thereby forming the xanthate ester. The xanthate ester is then pyrolyzed thereby resulting in the formation of the vinyladamantane. The conversion of the alpha-methyl-1-adamantanemethanol to the xanthate salt; the conversion of the xanthate salt to the xanthate ester; and the conversion of the xanthate ester to the vinyladamantane is preferably carried out in the liquid phase under refluxing conditions. In the conversion of the alpha-methyl-1-adamantanemethanol to the xanthate salt the temperature is maintained in the range of from about 0° C. to about 110° C., preferably in the range of from about 20° C. to about 40° C. The conversion of the xanthate salt to the xanthate ester is carried out at a temperature in the range of from about 0° C. to about 110° C., preferably in the range of from about 30° C. to about 70° C. The pyrolysis is carried out at a temperature in the range of from about 200° C. to about 400° C., preferably in the range of from about 250° C. to about 350° C. The pressure need only be sufficient to keep the reactants substantially in the liquid phase.

In order to more fully understand the method of our invention reference is made to the following examples:

EXAMPLE I

A mixture of 9.0 grams (0.05 mole) of alpha-methyl-1-adamantanemethanol and 3.1 grams (0.05 mole) of boric acid was slowly heated to 150–160° C. and held at this temperature for 2 hours. The temperature was thence slowly increased to 220° C. and maintained at 220° C. for three hours. The total reaction time was 7 hours. A yellow liquid was obtained which solidified on cooling. The solid material was placed in ether and the inorganic material which did not go into solution was removed by filtration. The ether was removed by evaporation and the resulting yellow liquid was distilled. 6.7 grams of a colorless liquid was obtained. The yield of vinyladamantane was approximately 83 percent.

EXAMPLE II

The procedure of Example I was repeated. The temperature, however, was maintained at 220° C. for 1 hour. In this case 2.2 grams (28 percent yield) of vinyladamantane was obtained.

EXAMPLE III

The procedure of Example I was repeated. The reaction temperature, however, was maintained at 220° C. for 3.75 hours. In this case 7.7 grams (95 percent yield) of vinyladamantane was obtained.

EXAMPLE IV

A mixture of 0.05 mole of 3,5-dipropyl-alpha-methyl-1-adamantanemethanol and 0.05 mole of boric acid is slowly heated to 150° C. and held at this temperature for 2 hours. The temperature is thence slowly increased to 220° C. and maintained at 220° C. for 3 hours. The total reaction time is 7 hours. A liquid is obtained which solidifies on cooling. The solid material is placed in ether and the inorganic material which does not go into solution is removed by filtration. The ether is removed by evaporation and the resulting liquid is distilled. A yield in excess of 30 percent of 1-vinyl-3,5-dipropyladamantane is otbained.

EXAMPLE V

Alpha-methyl-1-adamantanemethanol is passed through a Pyrex tube containing aluminum oxide. The tube is heated by an electric furnace to 390° C. The alpha-methyl-1-adamantanemethanol is added to the aluminum oxide at the rate of 60 milliliters per hour at a liquid hourly space velocity of 1. The products of the reaction are condensed and purified by distillation. 1-vinyladamantane at a yield in excess of 30 percent is obtained.

EXAMPLE VI

A mixture of 9.0 grams (0.05 mole) of alpha-methyl-1-adamantanemethanol and 2.0 grams sodium hydroxide in 30 milliliters of ether is stirred for 0.5 hour. 3.8 grams of carbon disulfide is then added during a 15 minute period with the temperature being maintained below 30° C. After 3 hours of stirring, 7.3 grams of methyl iodide is dropwise added and the mixture is stirred and refluxed for 6 hours. The sodium iodide is filtered off and the material is distilled. The xanthate ester produced is then heated to 250° C. and maintained at this temperature for 6 hours. The products of the reaction are purified by means of distillation. 1-vinyladamantane is obtained in a yield in excess of 30 percent.

EXAMPLE VII 4.1 grams of finely pulverized sodium hydroxide, 0.10 mole of alpha-methyl-1-adamantanemethanol, 60 ml. of ether and 5 ml. of carbon tetrachloride is stirred for approximately 30 minutes. 7.6 grams of carbon disulfide is then added over a 30-minute period of time. The temperature is maintained at less than about 30° C. After approximately 3 hours of stirring, 14.9 grams of methyl iodide is dropwise added and the mixture is stirred and refluxed for approximately 6 hours. After filtering off the sodium iodide, the lower boiling constituents are removed by distillation and the residual xanthate ester is pyrolyzed at approximately 250° C. The yield of 1-vinyladamantane is in excess of 20 percent.

In each of the examples hereinabove set forth, analysis of the products of the reaction is obtained through means of nuclear magnetic resonance, infrared, and elemental analysis. Analysis confirms the presence of the vinyl group at the bridgehead position of the adamantane nucleus.

When bridgehead alkyl substituted alpha-methyl-1-adamantanemethanol having from 1 to 3 alkyl substituents are substituted for the alpha-methyl-1-adamantanemethanol of the foregoing examples, substantially similar results are obtained. Example IV specifically shows the conversion of an alkyl alpha-methyl-1-adamantanemethanol to the corresponding vinyladamantane.

While our invention has been described in detailed examples with particular reference to specific embodiments, it will be appreciated that no unnecessary limitations are to be understood therefrom. The invention is not limited to the exact details shown and described, for obvious modifications will occur to those skilled in the art. The embodiments of the invention in which an exclusive property or privilege is claimed are defined by the appended claims.

We claim:

1. A process for the preparation of vinyladamantanes characterized by the formula

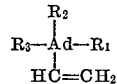

wherein Ad represents the adamantane nucleus and $R_1$, $R_2$ and $R_3$ are selected from the group consisting of hydrogen and alkyl groups having from 1 to 10 carbon atoms with the proviso that the total number of carbon atoms in said alkyl groups does not exceed 20, comprising contact a material characterized by the formula

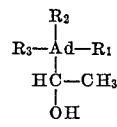

wherein Ad, $R_1$, $R_2$ and $R_3$ are defined as above with a dehydration agent selected from the group consisting of boric acid, acetic acid and aluminum oxide.

2. The process according to claim 1 wherein an intermediate ester is formed, said intermediate ester being subjected to pyrolysis thereby forming said vinyladamantane.

3. The process according to claim 2 wherein said dehydration agent is selected from the group consisting of boric acid and acetic acid.

4. The process according to claim 3 wherein said contacting takes place at a temperature in the range of from about 150° C. to about 160° C.

5. The process according to claim 4 wherein said pyrolysis takes place at a temperature in the range of from about 220° C. to about 400° C.

6. The process according to claim 5 wherein $R_1$, $R_2$ and $R_3$ are each hydrogen.

7. The process according to claim 1 wherein said dehydration agent is aluminum oxide.

8. The process according to claim 7 wherein said contacting is carried out at a temperature in the range of from about 300° C. to about 420° C.

9. The process according to claim 8 wherein $R_1$, $R_2$ and $R_3$ are each hydrogen.

10. The process for the preparation of vinyladamantanes characterized by the formula

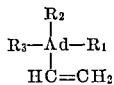

wherein Ad represents the adamantane nucleus and $R_1$, $R_2$ and $R_3$ are selected from the group consisting of hydrogen and alkyl groups having from 1 to 10 carbon atoms with the proviso that the total number of carbon atoms in said alkyl groups does not exceed 20, comprising contacting a material characterized by the formula

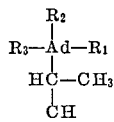

wherein Ad, $R_1$, $R_2$ and $R_3$ are defined as above with a base and carbon disulfide thereby forming a xanthate salt, contacting said xanthate salt with methyl iodide thereby forming a xanthate ester and subjecting said ester to pyrolysis thereby forming said vinyladamantane.

11. The process according to claim 10 wherein said contacting takes place in the presence of a solvent.

12. The process according to claim 10 wherein said xanthate salt is formed at a temperature within the range of from about 0° C. to about 110° C., wherein said xanthate ester is formed at a temperature in the range of from about 0° C. to about 110° C. and wherein said pyrolysis is carried out at a temperature in the range of from about 200° C. to about 400° C.

13. The process according to claim 12 wherein $R_1$, $R_2$ and $R_3$ are each hydrogen.

References Cited

UNITED STATES PATENTS 3,255,268  6/1966  Suld _____ 260—666

OTHER REFERENCES

Karrer: Org. Chem., 2nd Eng. Ed., Elsevier, New York, p. 217, 1946.

DELBERT E. GANTZ, *Primary Examiner.*

V. O'KEEFE, *Assistant Examiner.*